No. 852,929. PATENTED MAY 7, 1907.
W. A. COATES.
EYEGLASS FRAME.
APPLICATION FILED MAR. 9, 1906.
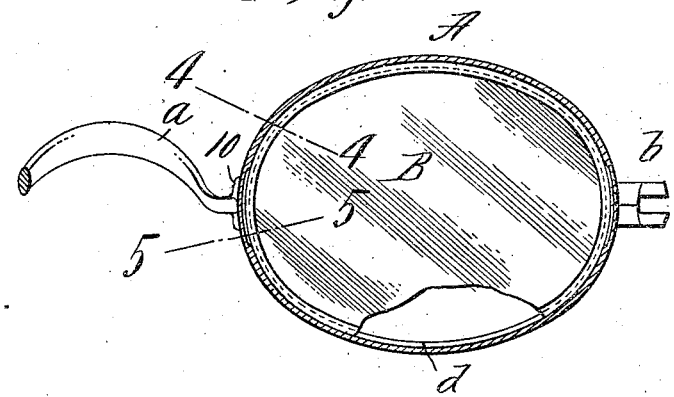
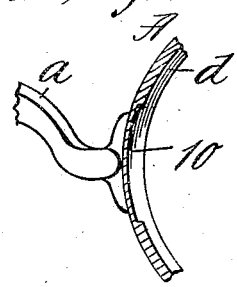
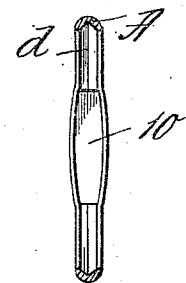
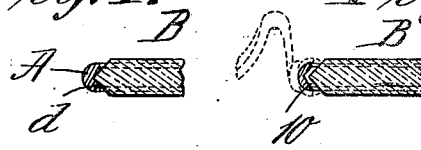
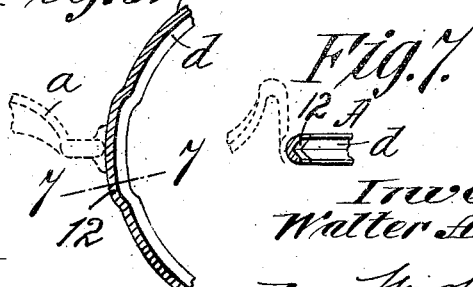
Witnesses:
Inventor,
Walter A. Coates,
by
Attorney

UNITED STATES PATENT OFFICE.

WALTER A. COATES, OF PROVIDENCE, RHODE ISLAND.

EYEGLASS-FRAME.

No. 852,929.  Specification of Letters Patent.  Patented May 7, 1907.

Application filed March 9, 1906. Serial No. 305,169.

*To all whom it may concern:*

Be it known that I, WALTER A. COATES, a citizen of the United States of America, and a resident of Providence, in the county of Providence and State of Rhode Island, have invented certain new and useful Improvements in Eyeglass-Frames, of which the following is a full, clear, and exact description.

This invention for improvements in spectacles and eye-glasses more particularly pertains to the construction of the lens holding frames thereof, and essentially consists in an eyeglass frame constructed with an internal lens engaging groove which at one or both ends of the frame has the contour of its wall outwardly disposed relatively to the general marginal contour of the lens and thereby rendered free from the end portion or portions of the lens, and all as hereinafter fully described and set forth in the claims.

It is a fact that the distorting strains brought upon the lens frame of a spectacle or eye glass are nearly entirely either at the outer portion of the frame at the end piece connection, or at the inner end portion of the frame at the nose piece connection, such strains being caused respectively by a leverage force exerted through the temple wires and end pieces,—with which such wires are connected,—when the temple wires are seized and spread, preparatory to adjusting the eye glass on the nose and engaging the temple wire extremities with or adjacent the ears, and by a leverage exerted between the nose piece or bridge when the latter is firmly set in place on the nose. These transversely distorting strains at the end or ends of the lens frame are, in the presence of this invention, non effective to cramp and fracture the marginal portion of the lens. And, furthermore, by the exercise of this invention, a lens a trifle larger than standard size may be fitted, in a frame a trifle smaller than standard size.

Other advantageous effects and capabilities are established by reason of the improved frame construction as will be hereinafter explained.

The improved lens frame for spectacles or eye glasses is illustrated in the accompanying drawings, in which,—

Figure 1 is a front view of a portion of a spectacle or eye glass, the frame thereof being shown in section. Fig. 2 is a sectional view of an inner end portion of the lens frame on a considerably larger scale. Fig. 3 is a view of the inner side of one end portion of the frame showing an additional structural feature hereinafter referred to. Figs. 4 and 5 are cross sectional views on lines 4—4, and 5—5, Fig. 1, and on a larger scale. Fig. 6 is a view similar to Fig. 2 but showing a modification in a manner of producing the outwardly disposed contour of the lens engaging groove, and Fig. 7 is a cross sectional view on line 7—7, of Fig. 6.

Similar characters of reference indicate corresponding parts in all of the views.

In the drawings,—A represents the frame of elliptical form for holding the lens B of the spectacle or eye glass, the same having the nose piece $a$ connected thereto at its inner end, and $b$ in Fig. 1 represents the end piece for the connection therewith, pivotally of the temple wire.

The lens frame is made of a length of wire having a V-shaped groove $d$ therein at its inner edge for the engagement therein of the V-shaped edge of the lens, such wire being bent to elliptical form, and held closed at the adjacent ends by the usual screw provided in the end piece ears. The frame is shown as constructed with the internal continuous groove therein having the contour of its base portion at the opposite frame ends outwardly disposed, that is in the direction of the long diameter of the frame. This feature in practice is acquired after the nose and end pieces or the blanks therefor have been soldered in place and by the use of dies which deepen the groove, as represented at 10 in Figs. 1, 2, 3 and 5 for portions of the length of the groove sufficient for the endwise freedom of engagement between the lens and frame and about proportionately, as represented in the drawings.

In the process of soldering on the end pieces and the partially shaped nose piece, the heat applied at the ends of the lens frame more or less anneals and softens the metal, and, therefore, the time of deepening the groove within the frame ends by the use of dies after the connections of the end piece and nose piece by soldering being the preferable one, is because in the groove deepening action the metal at the ends of the frame is condensed and hardened and the weakening action produced by the soldering process is compensated for,—in other words the temper is restored to the metal at the places of groove deepening whereat it may have been withdrawn.

The relations of the lens ends to the frame ends represented in Figs. 1, and 5, is such that transversely distorting strains which are practically only likely to occur at the frame ends will be without effect to chip off, split or crack the lens; and by the leeway afforded by the stated structural feature the frame may be tightened for its entirely reliable engagement about the lens even in cases where there may be variations from the standard sizes either of the lens or the frame.

In Figs. 6 and 7 the endwise outward disposition of the base of the groove relatively to the general elliptical contour of the frame is accomplished by very slightly outwardly displacing the end portion of the frame constituting wire, as represented at 12, in which case the V groove is of equal depth within, and throughout the entire length of, the frame but, nevertheless, more or less free from engagement with the edge of the lens at its end portion. The wall of the groove in addition to having a disposition endwise outwardly relatively to the length of the frame may be widened, as represented in Fig. 3 in the initial manufacture of the frame, the frame being left in the form shown for use in embracing and holding the lens or the wire of the frame may, by swaging be restored more or less nearly to its normal width with the result of hardening the metal at the portion thereof which has the conformation stated, and it is possible, optional, to the constructor, to have the frame free of the glass transversely of the plane thereof instead of, or additional to, the freedom which has been more particularly emphasized as between the ends of the lens and frame. Of course, instead of making the groove of V shape it might be made of a U or other appropriate shape for the engagement with a lens correspondingly edgewise formed.

I claim:—

1. An eye glass frame constructed with an internal lens engaging groove and having a nose piece connected thereto at one end thereof, and said groove at its portion opposite said nose piece having the contour of its base portion outwardly disposed relatively to the general contour of the lens and thereby free from contact, at such portion of the groove base, with the marginal end portion of the lens.

2. An eye glass frame constructed with an internal lens engaging groove and having an end piece connected thereto at one end thereof, and said groove having the contour of its base portion opposite said end piece outwardly disposed relatively to the general contour of the lens and thereby free from contact, at such portion of the groove base, with the adjacent marginal end portion of the lens.

Signed by me at Springfield, Mass., in presence of two subscribing witnesses.

WALTER A. COATES.

Witnesses:
  WM. S. BELLOWS,
  G. R. DRISCOLL.